US009660879B1

United States Patent
Rothstein et al.

(10) Patent No.: US 9,660,879 B1
(45) Date of Patent: May 23, 2017

(54) FLOW DEDUPLICATION ACROSS A CLUSTER OF NETWORK MONITORING DEVICES

(71) Applicant: ExtraHop Networks, Inc., Seattle, WA (US)

(72) Inventors: Jesse Abraham Rothstein, Seattle, WA (US); Kevin Michael Seguin, Seattle, WA (US); William Henry Mortensen, Seattle, WA (US); Alexander Christian Leone, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 15/219,016

(22) Filed: Jul. 25, 2016

(51) Int. Cl.
*H04L 12/26* (2006.01)
*H04L 29/06* (2006.01)
*H04L 29/08* (2006.01)

(52) U.S. Cl.
CPC ............ *H04L 43/026* (2013.01); *H04L 67/28* (2013.01); *H04L 69/161* (2013.01); *H04L 69/22* (2013.01)

(58) Field of Classification Search
USPC .......... 370/232–389; 709/213–223, 229–231
See application file for complete search history.

(56) References Cited

U.S. PATENT DOCUMENTS

| | | | |
|---|---|---|---|
| 5,027,269 A | 6/1991 | Grant | |
| 5,430,727 A | 7/1995 | Callon | |
| 5,541,995 A | 7/1996 | Normile et al. | |
| 5,715,464 A | 2/1998 | Crump et al. | |
| 5,787,237 A | 7/1998 | Reilly | |
| 5,802,599 A | 9/1998 | Cabrera et al. | |
| 5,835,726 A | 11/1998 | Shwed et al. | |
| 5,857,188 A | 1/1999 | Douglas | |
| 5,928,363 A | 7/1999 | Ruvolo | |
| 6,141,686 A | 10/2000 | Jackowski et al. | |
| 6,263,049 B1 | 7/2001 | Kuhn | |
| 6,321,338 B1 | 11/2001 | Porras et al. | |

(Continued)

OTHER PUBLICATIONS

Official Communication for U.S. Appl. No. 15/207,213 mailed on Oct. 25, 2016, 18 pages.

(Continued)

*Primary Examiner* — Man Phan
(74) *Attorney, Agent, or Firm* — John W. Branch; Lowe Graham Jones PLLC

(57) ABSTRACT

Embodiments are directed to monitoring flows of packets over a network. If a network monitoring computer (NMC) in a cluster of NMCs observes a new network flow, the NMC may perform a variety of actions to determine the NMC that is responsible for monitoring the new network flow. Network traffic associated with the new network flow may be buffered in a non-transitory processor readable media. The new network flow may be registered with the plurality of NMCs, providing an identifier that corresponds to one NMC. Registering may include, assigning the NMC a responsibility to monitor the new network flow. If the identifier corresponds to the NMC that observed the new network flow, the network traffic associated with the new network flow is processed using that NMC. If the identifier corresponds to another NMC, the buffered network traffic is forwarded to the other NMC.

24 Claims, 7 Drawing Sheets

(56) References Cited

U.S. PATENT DOCUMENTS

| | | |
|---|---|---|
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,704,311 B1 | 3/2004 | Chuah et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,999,729 B2 | 2/2006 | Wandel |
| 7,042,888 B2 | 5/2006 | Berggreen |
| 7,089,326 B2 | 8/2006 | Boucher et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,474,654 B2 | 1/2009 | Guru |
| 7,480,292 B2 | 1/2009 | Busi et al. |
| 7,535,906 B2 | 5/2009 | Engbersen et al. |
| 7,545,499 B2 | 6/2009 | Overbeck et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,774,456 B1 | 8/2010 | Lownsbrough et al. |
| 7,809,829 B2 * | 10/2010 | Kelly ............... H04L 43/026 370/232 |
| 7,817,549 B1 * | 10/2010 | Kasralikar ......... H04L 43/026 370/232 |
| 7,864,764 B1 | 1/2011 | Ma et al. |
| 7,916,652 B1 | 3/2011 | Lima et al. |
| 7,979,555 B2 | 7/2011 | Rothstein et al. |
| 8,079,083 B1 | 12/2011 | Bennett et al. |
| 8,125,908 B2 | 2/2012 | Rothstein et al. |
| 8,185,953 B2 | 5/2012 | Rothstein et al. |
| 8,411,677 B1 | 4/2013 | Colloff |
| 8,619,579 B1 | 12/2013 | Rothstein et al. |
| 8,861,397 B2 * | 10/2014 | Kind ............... H04L 43/026 370/235 |
| 8,971,196 B2 * | 3/2015 | Degioanni ........ H04L 67/1097 370/252 |
| 9,036,493 B2 * | 5/2015 | Degioanni ........ H04L 67/1097 370/252 |
| 9,049,216 B2 * | 6/2015 | McCanne ......... H04L 67/1097 |
| 9,203,865 B2 * | 12/2015 | Linden ............... G06F 11/181 |
| 9,264,288 B1 * | 2/2016 | Arora ................. H04L 65/00 |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0107953 A1 | 8/2002 | Ontiveros et al. |
| 2002/0133586 A1 | 9/2002 | Shanklin et al. |
| 2002/0152209 A1 | 10/2002 | Merugu et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0233361 A1 | 12/2003 | Cady |
| 2004/0003094 A1 | 1/2004 | See |
| 2004/0047325 A1 | 3/2004 | Hameleers et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0182833 A1 | 8/2005 | Duffie et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0123477 A1 | 6/2006 | Raghavan et al. |
| 2006/0174343 A1 | 8/2006 | Duthie et al. |
| 2006/0184535 A1 | 8/2006 | Kaluskar et al. |
| 2006/0230456 A1 | 10/2006 | Nagabhushan et al. |
| 2007/0039051 A1 | 2/2007 | Duthie et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0192863 A1 | 8/2007 | Kapoor et al. |
| 2007/0239639 A1 | 10/2007 | Loughmiller et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas |
| 2008/0069002 A1 | 3/2008 | Savoor et al. |
| 2008/0130659 A1 | 6/2008 | Polland |
| 2008/0141275 A1 | 6/2008 | Borgendale et al. |
| 2008/0147818 A1 | 6/2008 | Sabo |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2009/0010259 A1 | 1/2009 | Sirotkin |
| 2009/0034426 A1 | 2/2009 | Luft et al. |
| 2009/0168657 A1 | 7/2009 | Puri et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0296593 A1 | 12/2009 | Prescott |
| 2010/0091770 A1 | 4/2010 | Ishikawa |
| 2010/0095367 A1 | 4/2010 | Narayanaswamy |
| 2010/0250928 A1 | 9/2010 | Goto |
| 2010/0299158 A1 | 11/2010 | Siegel |
| 2010/0316216 A1 | 12/2010 | Fukushima et al. |
| 2010/0322248 A1 | 12/2010 | Ivanov |
| 2011/0019574 A1 | 1/2011 | Malomsoky et al. |
| 2011/0073490 A1 | 3/2011 | Hayamizu et al. |
| 2011/0280149 A1 | 11/2011 | Okada et al. |
| 2011/0320394 A1 | 12/2011 | McKeown et al. |
| 2012/0166962 A1 | 6/2012 | Lunsford |
| 2012/0176917 A1 | 7/2012 | Matityahu et al. |
| 2012/0215328 A1 | 8/2012 | Schmelzer |
| 2012/0243533 A1 | 9/2012 | Leong |
| 2012/0294305 A1 | 11/2012 | Rose et al. |
| 2013/0010608 A1 | 1/2013 | Ramachandran et al. |

(56) References Cited

U.S. PATENT DOCUMENTS

| | | |
|---|---|---|
| 2013/0042323 A1 | 2/2013 | Narayanaswamy |
| 2013/0061036 A1 | 3/2013 | Oliver |
| 2013/0064084 A1 | 3/2013 | Babbar et al. |
| 2013/0103734 A1 | 4/2013 | Boldyrev et al. |
| 2013/0166730 A1 | 6/2013 | Wilkinson |
| 2013/0232104 A1 | 9/2013 | Goyal et al. |
| 2014/0040451 A1 | 2/2014 | Agrawal et al. |
| 2014/0077956 A1 | 3/2014 | Sampath et al. |
| 2014/0142972 A1 | 5/2014 | Hosenfeld, Jr. |
| 2014/0304211 A1 | 10/2014 | Horvitz |
| 2015/0134554 A1 | 5/2015 | Clais et al. |
| 2015/0199613 A1 | 7/2015 | Ruiz et al. |
| 2016/0219066 A1 | 7/2016 | Vasseur et al. |

OTHER PUBLICATIONS

Official Communication for U.S. Appl. No. 12/326,672 mailed on Jun. 9, 2010 (9 pages).
Official Communication for U.S. Appl. No. 12/326,672 mailed on Dec. 23, 2010 (15 pages).
Official Communication for U.S. Appl. No. 12/326,672 mailed on Jun. 22, 2011 (16 pages).
Official Communication for U.S. Appl. No. 12/326,672 mailed on Oct. 24, 2011 (9 pages).
Lin, Mark, "An Overview of Session Hijacking at the Network and Application Levels," Jan. 18, 2005 (16 pages).
U.S. Appl. No. 11/683,643, entitled "Detecting Anomalous Network Application Behavior", by Jesse Abraham Rothstein and Arindum Mukerji, filed Mar. 8, 2007 (40 pages).
U.S. Appl. No. 11/679,356 entitled "Capture and Resumption of Network Application Sessions", by Jesse Abraham Rothstein and Arindum Mukerji, filed Feb. 27, 2007 (37 pages).
Official Communication for U.S. Appl. No. 11/683,643 mailed on Apr. 28, 2010 (35 pages).
Official Communication for U.S. Appl. No. 11/683,643 mailed on Oct. 14, 2010 (43 pages).
Official Communication for U.S. Appl. No. 11/683,643 mailed on Aug. 25, 2011 (43 pages).
Official Communication for U.S. Appl. No. 11/683,643 mailed on Jan. 23, 2012 (6 pages).
Official Communication for U.S. Appl. No. 13/831,626, mailed Sep. 3, 2013, (17 pages).
Official Communication for U.S. Appl. No. 13/831,673 mailed on Sep. 30, 2013, (10 pages).
Official Communication for U.S. Appl. No. 13/831,673 mailed on Mar. 6, 2014, (12 pages).
Official Communication for U.S. Appl. No. 13/831,673 mailed on May 22, 2014, (5 pages).
Official Communication for U.S. Appl. No. 14/518,996 mailed on Nov. 20, 2014, (41 pages).
Official Communication for U.S. Appl. No. 13/831,908 mailed on Jun. 25, 2014, (15 pages).
Official Communication for U.S. Appl. No. 14/500,893 mailed on Nov. 20, 2014, (15 pages).
Official Communication for U.S. Appl. No, 13/831,908 mailed on Apr. 9, 2014, (3 pages).
Official Communication for U.S. Appl. No, 13/831,908 mailed on Aug. 9, 2013, (29 pages).
Official Communication for U.S. Appl. No. 13/831,908 mailed on Jan. 13, 2014, (31 pages).
Official Communication for U.S. Appl. No. 14/107,631 mailed on Dec. 30, 2014, (12 pages).
Handel et al. "Hiding Data in the OSI Network Model," Los Alamos, New Mexico, 1996, (16 pages).
Official Communication for U.S. Appl. No. 14/107,631 mailed on Feb. 20, 2014, (16 pages).
Official Communication for U.S. Appl. No. 14/107,631 mailed on Sep. 26, 2014, (14 pages).
Handley et al., "Network Intrusion Detection: Evasion, Traffic Normalization, and End-to-End Protocol Semantics," 2011, International Computer Science Institute, (17 pages).
Information Sciences Institute, "Internet Protocol Darpa Internet Program Protocol Specification," Sep. 1981, (36 pages).
Fuertes, "Evaluation of OSPF Extensions in MANET Routing," Paris, 2007, (192 pages).
Parsons, "Moving Across the Internet: Code-Bodies, Code-Corpses, and Network Architecture," May 9, 2010, (20 pages).
Zander et al., "Covert Channels and Countermeasures in Computer Network Protocols," Dec. 2007, (7 pages).
Official Communication for U.S. Appl. No. 14/500,893 mailed on Feb. 18, 2015, (11 pages).
Official Communication for U.S. Appl. No. 14/107,580 mailed on Mar. 6, 2014, (13 pages).
Official Communication for U.S. Appl. No. 14/107,580 mailed on Sep. 15, 2014, (15 pages).
Official Communication for U.S. Appl. No. 14/107,580 mailed on Mar. 17, 2015, (5 pages).
Official Communication for U.S. Appl. No. 11/679,356 mailed on Jun. 22, 2009, (21 pages).
Official Communication for U.S. Appl. No. 11/679,356 mailed on Dec. 11, 2009, (23 pages).
Official Communication for U.S. Appl. No. 11/679,356 mailed on Feb. 22, 2010, (3 pages).
Official Communication for U.S. Appl. No. 11/679,356 mailed on Sep. 9, 2010, (7 pages).
Official Communication for U.S. Appl. No. 11/679,356 mailed on Mar. 4, 2011, (15 pages).
Official Communication for U.S. Appl. No. 15/014,932 mailed on Jun. 10, 2016, (20 pages).

* cited by examiner

FLOW DEDUPLICATION ACROSS A CLUSTER OF NETWORK MONITORING DEVICES

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

Furthermore, as information technology infrastructure becomes more complex and more dynamic, more than one network monitoring device may be deployed to monitor network traffic on a network. Accordingly, in certain operating environments, there may be multiple network monitoring devices exposed to duplicate network traffic. In some cases, one or more NMCs may be on different networks or monitoring networks that are configured to be separate from each other. Determining correlations or other information from monitoring data that includes duplicative data may be difficult. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE INVENTION

Figure 1:
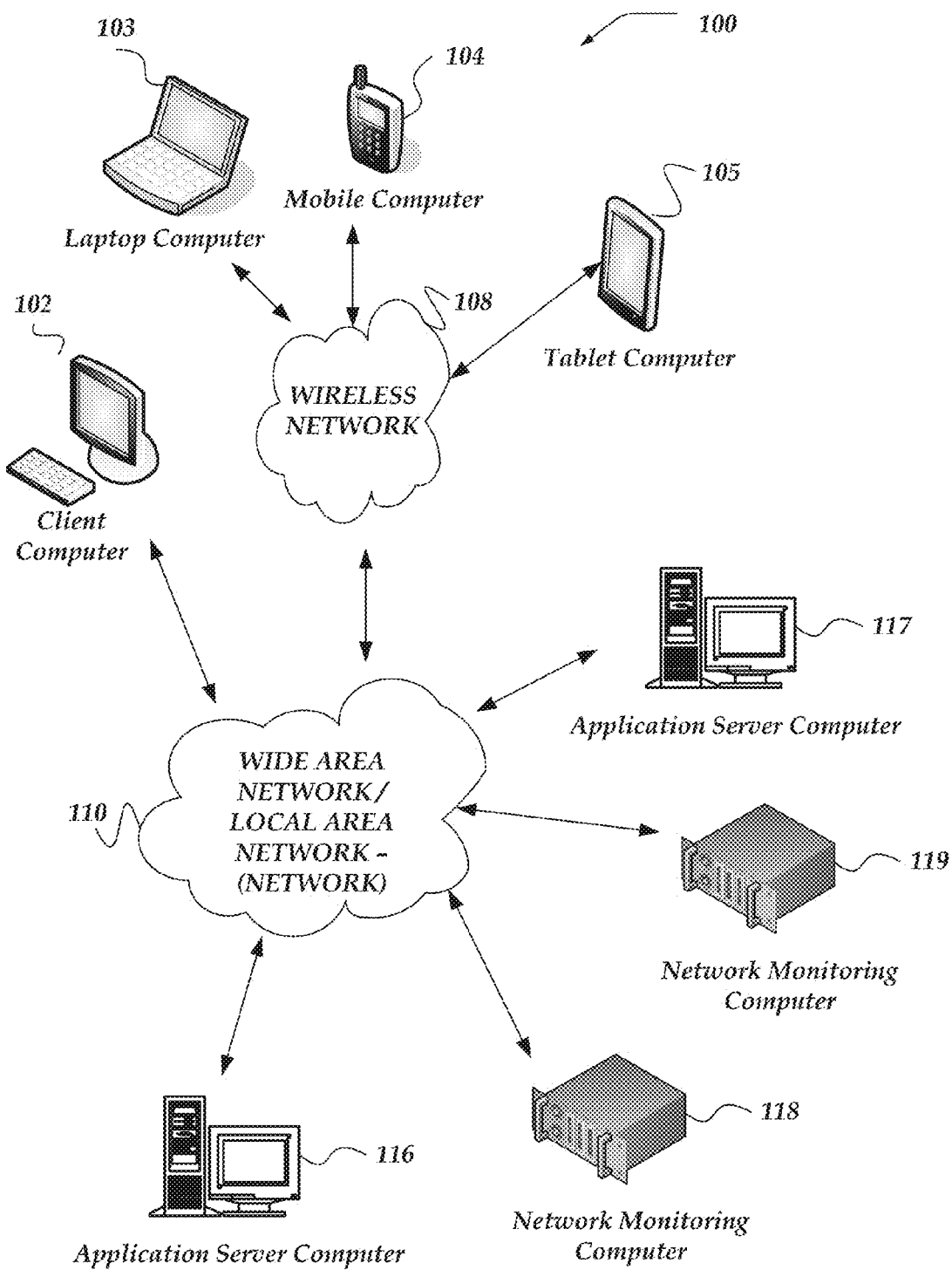
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In at least one embodiment, the NMC passively monitors network packet traffic without participating in the communication protocols. This monitoring is performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end-to-end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from four to seven, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring flows of packets over a network. In at least one of the various embodiments, if a network monitoring computer (NMC) in a cluster of NMCs may be provided a new network flow, the NMC may perform a variety of actions.

In at least one of the various embodiments, network traffic information associated with the new network flow may be buffered in a non-transitory processor readable media. In some embodiments, network traffic information may include the actual network packets associated with the new network flow, or summary information such as metrics, state information, statistics, or the like. In at least one of the various embodiments, the new network flow may be registered with the plurality of NMCs, such that, the registration provides an identifier that may correspond to one or more NMCs of the plurality of NMCs. In at least one of the various embodiments, registering the new network flow with the plurality of NMCs, may include, assigning the one or more NMCs a responsibility to monitor the new network flow, such that, the one or more NMCs correspond to the identifier.

In at least one of the various embodiments, registering the new network flow with the plurality of NMCs may include: providing an indication that the one or more NMCs that correspond to the identifier have registered an interest in one or more network flows that may be related to the new network flow; and forwarding network traffic that may be associated with the one or more related network flows to the one or more NMCs that correspond to the identifier.

In at least one of the various embodiments, registering the new network flow with the plurality of NMCs may include, providing the identifier based on a hashing of some or all of the tuple information that may be associated with the new network flow. Also, in at least one of the various embodiments, registering the new network flow with the plurality of NMCs, may include, providing the identifier based on an execution of one or more defined static policies.

In at least one of the various embodiments, if the identifier corresponds to the NMC that was provided the new network flow, the network traffic associated with the new network flow may be processed using the NMC that was provided the new network flow.

In at least one of the various embodiments, if the identifier corresponds to another NMC, the buffered network traffic information may be forwarded to the other NMC.

In at least one of the various embodiments, if provided network flows may be absent from a network flow table of the NMC, the provided network flows may be classified as new network flows. In at least one of the various embodiments, information associated with the new network flow may be stored in a network flow table, wherein the information includes, one or more of tuple information, the identifier, or a timeout value.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Application Server Computer 116, Application Server Computer 117, Network Monitoring Computer 118, Network Monitoring Computer 119, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, application server computer 117, network monitoring computer 118, network monitoring computer 119, or other computers.

Client computers 102-105 may further be configured to include a client application that enables an end-user to log into an end-user account that may be managed by another computer, such as application server computer 116, application server computer 117, network monitoring computer 118, network monitoring computer 119, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118 or network monitoring computer 119. Also, client computers may be arranged to enable users to display reports, interactive user-interfaces, and/or results provided by network monitor computer 118 or network monitoring computer 119.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 117, network monitoring computer 118, network monitoring computer 119, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 and/or application server computer 117 is described in more detail below in conjunction with FIG. 3. Briefly, however, application server computer 116-117 includes virtually any network computer capable of hosting applications and/or providing services in network environment.

One embodiment of network monitoring computer 118 and/or network monitoring computer 119 are described in more detail below in conjunction with FIG. 3. Briefly, however, network monitoring computer 118 or network monitoring computer 119 include virtually any network computer capable of passively monitoring communication traffic in a network environment.

Although FIG. 1 illustrates application server computer 116, application server computer 117, and network monitor device 118, each as a single computer, the innovations and/or embodiments are not so limited. For example, one or more functions of application server computers 116-117, and/or network monitoring computer 118, network monitoring computer 119, or the like, may be distributed across one or more distinct network computers. Moreover, in at least one embodiment, network monitoring computer 118 or network monitoring computer 119 may be implemented using a plurality of network computers. Further, in at least one of the various embodiments, application server computers 116-117, and/or network monitoring computer 118 or network monitoring computer 119 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
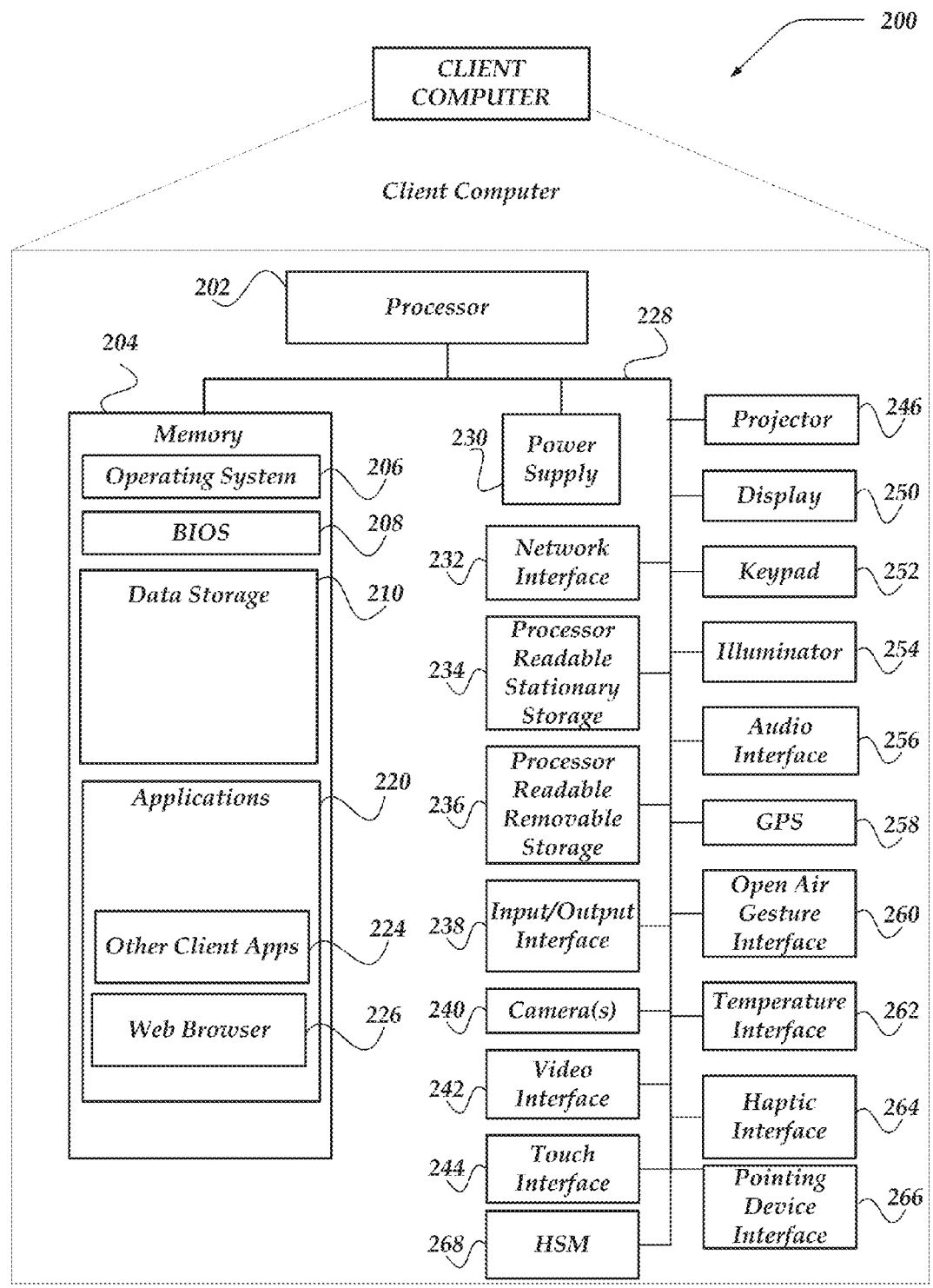
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
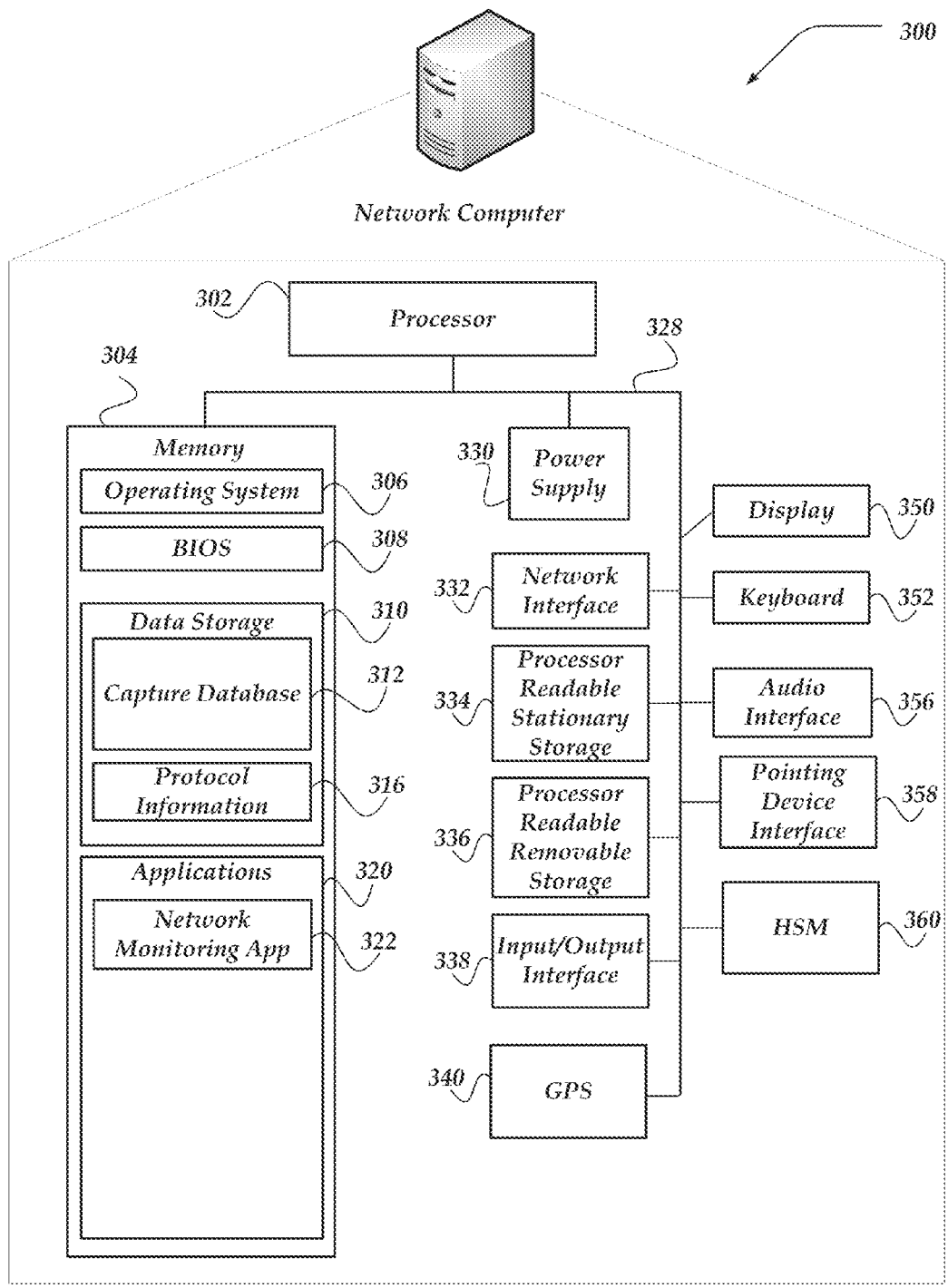
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computers 116-117, network monitoring computer 118 and/or network monitoring computer 119 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture database 312, protocol information 316, or the like. Capture database 312 may be a data store that contains one or more records, logs, events, or the like, produced during monitoring of the networks. Protocol information 316 may contain various rules and/or configuration information related to one or more network communication protocols (e.g., HL7, TCP, HTTP, or the like) that may be employed, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring application 322 that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, network monitoring application 322 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to network monitoring application 322 may be provisioned and de-commissioned automatically.

Also, in at least one of the various embodiments, network monitoring application 322, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), the network computer may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In at least one embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
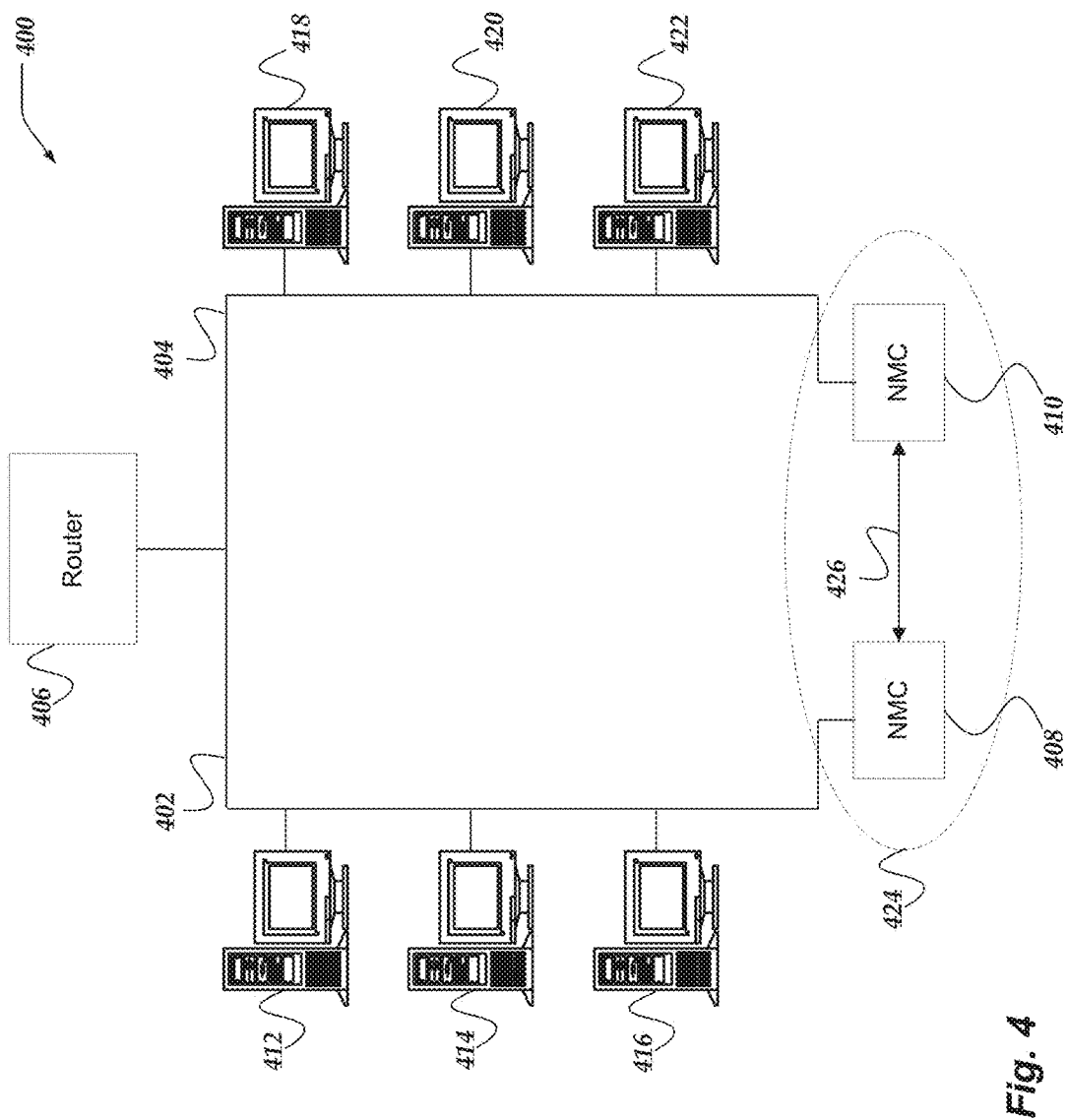
FIG. 4 illustrates a logical architecture of a system for flow deduplication across a cluster of network monitoring devices in accordance with at least one of the various embodiments.

FIG. 4 illustrates a logical architecture of system 400 for flow deduplication across a cluster of network monitoring devices in accordance with at least one of the various embodiments. System 400 may be arranged to include a plurality of network devices and/or network computers on first network 402 and a plurality of network devices and/or network computers on second network 404. In some embodiments, communication on network 402 may be routed to network 404 by router 406. Also, NMC 408 may be arranged to passively monitor and/or record network packets that may be communicated in network connection flows between network devices and/or network computers on network 402, such as, network computer 412, network computer 414, or network computer 416. Likewise, in some embodiments, NMC 410 may be arranged to passively monitor and/or record network packets that may be communicated in network connection flows between network devices and/or network computers on network 404, such as, network computer 418, network computer 420, or network computer 422.

In some embodiments, NMC 408 and NMC 410 may be arranged to receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring may enable analysis and debugging of network communications. Port mirroring can be performed for inbound or outbound traffic (or both) on single or multiple interfaces.

In some embodiments, NMC 408 and NMC 410, or other NMCs (not shown) in the networking environment may capture/monitor the same network packets. For example, this may occur if NMC 410 observes a packet in network 404 that is subsequently routed over to network 402. Accordingly, in some embodiments, NMCs monitoring separate sub-networks may generate metrics for the same network packets. In some cases, the duplicate packets may cause double counting of metrics or other types of conflicts results that may be difficult to correct later.

Accordingly, in at least one of the various embodiments, one or more NMCs, such as, NMC 408 and NMC 410, may be arranged into a logical cluster, such as, logical cluster 424. In some embodiments, arranging the one or more NMCs into a logical cluster may include providing network configuration that enables each of the NMCs in the same logical cluster to access (e.g., see) each other in the network. In some embodiments, the NMCs in a logical cluster may be interconnected by separate physical networks, or in other embodiments, the NMCs in a logical cluster may use the same physical network as the other devices, such as, network 402 and network 404. In FIG. 4, network patch 426 represents the physical and/or logical communicative coupling between the NMCs in logical cluster 424.

In at least one of the various embodiments, NMCs in a logical cluster may be arranged to work together to cooperatively monitor network flows that may provide packets to more than one network. In this example, NMC 408 and NMC 410 may be arranged into logical cluster 424. Accordingly, in some embodiments, NMC 408 and NMC 410 may be arranged to share information between themselves to recognize any duplicate packets that may be routed from one network to another and seen by different NMCs.

In at least one of the various embodiments, each NMC in a cluster may be arranged to include a network flow table in memory that records at least the tuple information for network flows that may have been seen by a given NMC. In some embodiments, the network flow tables may identify/index network flows using tuple information that may be obtained from the network packets that may be observed by the NMCs. Accordingly, in some embodiments, the network flow tables enable NMCs to record which network flows have been observed and to determine if an observed network packet may be associated with a known network flow. Likewise, the network flow table may be arranged to store additional status and/or state information associated with each recorded network. For example, the network flow table may include timestamp information recording the last time a packet for a given flow has been observed.

In at least one of the various embodiments, network flow tables may be stored in memory or high-speed cache memory on each NMC. Accordingly, the network flow table may be limited to a defined number of network flows. In some embodiments, network flows may be removed from the network flow table based on one or more criteria. In some embodiments, network flows may be removed from the network flow table if the NMC determines that the connections associated with a particular network flow are closed. Determining if a connection is closed may depend on observing the contents of one or more network packets that may be associated with the network flow. In some embodiments, NMCs may be arranged to identify one or more patterns in a network packet or sequence of network packets that indicate for a given network protocol and/or network application, that the connections for the network flow are closing.

In at least one of the various embodiments, NMCs may be arranged to remove a network flow from their network flow table if a defined timeout expires before a network packet determined to be associated with the network flow is observed by the NMC.

In other embodiments, NMCs may be arranged to apply one or more rule-based policies for if network flows should be added and/or removed from a network flow table. For example, in at least one of the various embodiments, the rules may identify flows that may be ignored.

In at least one of the various embodiments, NMCs associated in a logical cluster may be arranged to use their network flow tables to maintain a list of network flows that may be used for differentiating between network flows that the NMC is responsible for processing (e.g., monitoring) and those network flows that they are not responsible for processing.

In some embodiments, NMCs in a logical cluster may be arranged to assign themselves an index value, or other identifier, that may be used to identify a particular NMC. In some embodiments, the index value may be assigned using configuration information. In other embodiments, the NMCs associated in a logical cluster may perform an election operation to select one NMC of the cluster to assign index values to each NMC in the cluster.

In at least one of the various embodiments, if a network packet is observed at an NMC in a cluster, the NMC may check if the network flow associated with the network packet is known to the cluster. In some embodiments, known network flows may be considered to be registered with the cluster. Likewise, in some embodiments, unknown network flows may be considered unregistered.

In at least one of the various embodiments, if a network packet is provided to an NMC, the NMC may check its network flow table to see if the network flow associated with the network packet is known to the NMC. In some embodiments, the NMC may have an entry in its flow table that indicates whether the network flow associated with a provided network packet is known. If so, the entry may indicate how the NMC should handle the network packets associated with the flow. In some embodiments, a NMC may be assigned to process network packets associated with some network flows and/or discard network packets associated with other network flows.

In at least one of the various embodiments, if a network flow associated with a network packet is not in a NMC's network flow table, the NMC may be arranged to perform various actions depending on the configuration of the NMC. In some embodiments, the NMC may be arranged to compute a hash key value from some or all of the tuple information included in the network packet. The hash key may be used to select a NMC within the logical cluster. For example, if each NMC in the cluster is assigned an identifier, such as, an index value, the value of the hash key may be used to identify which one of the index values should be selected—thus selecting an NMC. In at least one of the various embodiments, the selected NMC may be forwarded the network packet for processing.

In at least some of the various embodiments, NMCs in a logical cluster may be arranged to observe all of the network packets that reach the logical cluster. In these embodiments, in some cases, each NMC may be arranged to keep a record of which network flows it is responsible for in its network flow table as well as which network flows is not responsible for. Accordingly, in such configurations, the NMC may ignore network packets associated with network flows that are indicated as having other responsible NMCs since it can assume that those NMCs will have a chance to observe those network packets.

In some embodiments, the NMCs may be arranged to actively forward network packets to the NMC that may be responsible for processing the network flows associated with received network packets. In some embodiments, the NMCs may be arranged to only forward packets associated with unknown flows to the NMC determined to be responsible for the observed network flow.

In at least one of the various embodiments, the logical NMC cluster may be arranged to have a leader NMC that other NMCs may forward packets that are associated with unknown network flows. Accordingly, in some embodiments, the leader NMC may execute one or more rules to determine which NMC should be assigned the network flow.

For example, in some embodiments, the NMC designated as the cluster leader may execute one or more rule based policies that assign a responsible NMC to each seen network flow. Likewise, in some embodiments, the policy rules executed by the leader NMC may assign network flows to NMCs based on the contents of one or more network packets. For example, in some embodiments, a high-traffic database application may be assigned to a particular NMC that may have performance capabilities tailored to handle the large amount of traffic. Likewise, in some embodiments, the leader NMC may execute policy rules that may determine if one or more network flows may be discarded or disregarded.

In at least one of the various embodiments, an NMC that observes new network flows may be arranged to execute one or more rule based policies to determine if it is responsible for a new network flow. For example, an NMC in a cluster may be arranged to monitor network traffic that is associated with one or more defined network applications, such as, databases, web applications, voice over IP, or the like, or combination thereof. Accordingly, in this example, the NMC may be arranged to execute rules that analyze the network traffic associated with the new network flow to determine if the new network flow is associated with the one or more defined network applications of interest. The type of analysis may vary depending on the characteristics of the network traffic used to identify the applications of interest. For example, in some cases, the header fields or tuple information may include sufficient information. In other cases, the NMC may be arranged to perform deep packet inspection to identify if the network traffic is of interest.

In some embodiments, if there is a leader NMC in the cluster, it may communicate information regarding the network flows to each of the NMCs in the cluster. For example, in at least one of the various embodiments, if the leader NMC determines a responsible NMC for a flow it may send this information to the other NMCs in the cluster. Accordingly, in some embodiments, the NMCs may update their local network flow tables to indicate if they should process packets for a particular network flow or not.

In at least one of the various embodiments, an NMC cluster may be arranged to include one or more sub-clusters (not shown). For example, in some embodiments, NMC 408 and/or NMC 410 may represent separate sub-clusters of NMCs. In at least one of the various embodiments, the identifier and/or the index value for NMC 408 or NMC 410 may actually reference a sub-cluster of two or more NMCs. In at least one of the various embodiments, sub-clusters may be considered regular NMC clusters as far as how they may be arranged to distribute network flows among the NMCs in the sub-cluster. However, in at least one of the various embodiments, a sub-cluster of NMCs may employ different distribution/assignment rules than the parent cluster.

Generalized Operations

Figure 5:
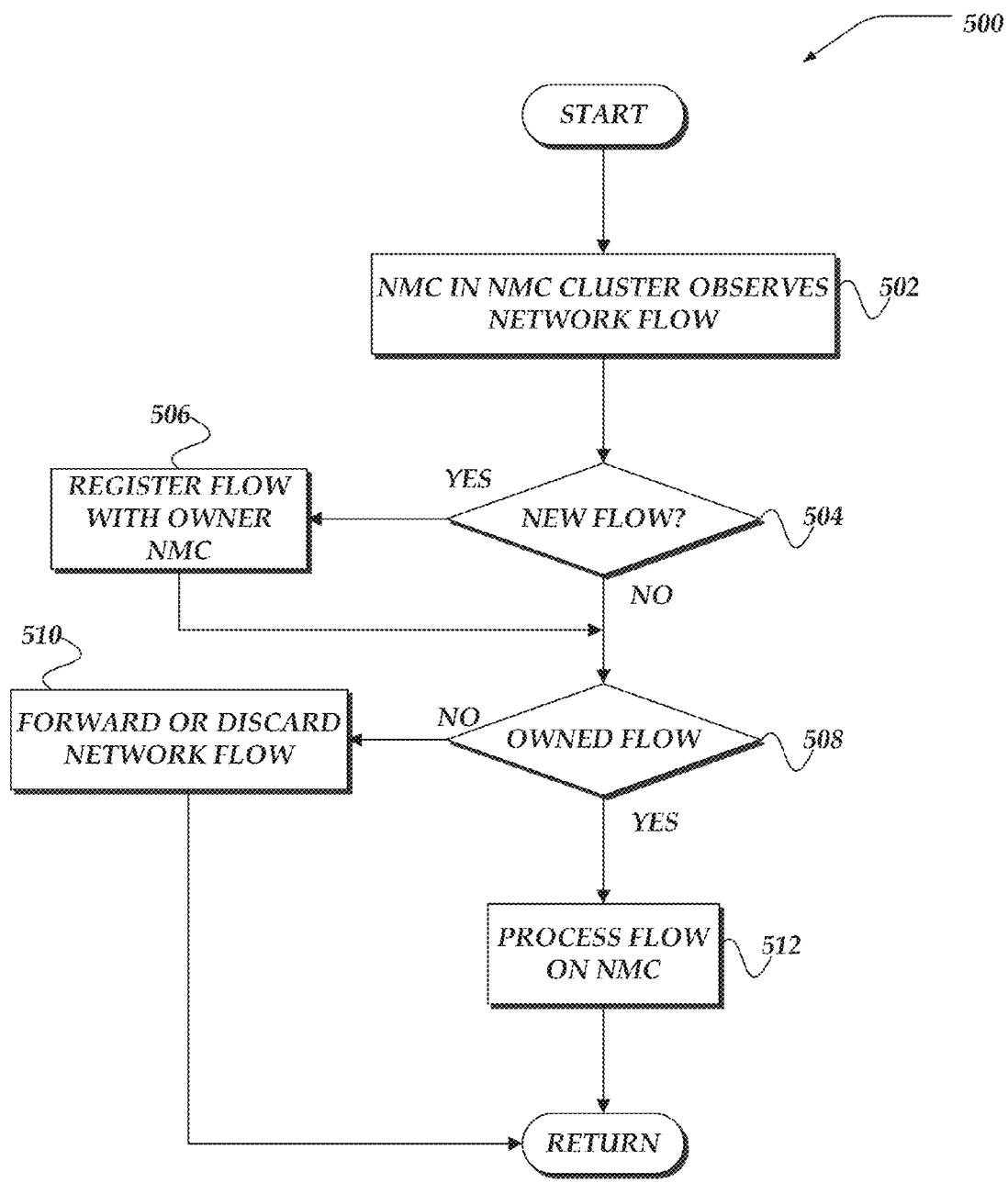
FIG. 5 illustrates an overview flowchart of a process for flow deduplication across a cluster of network monitoring devices in accordance with at least one of the various embodiments.
Figure 6:
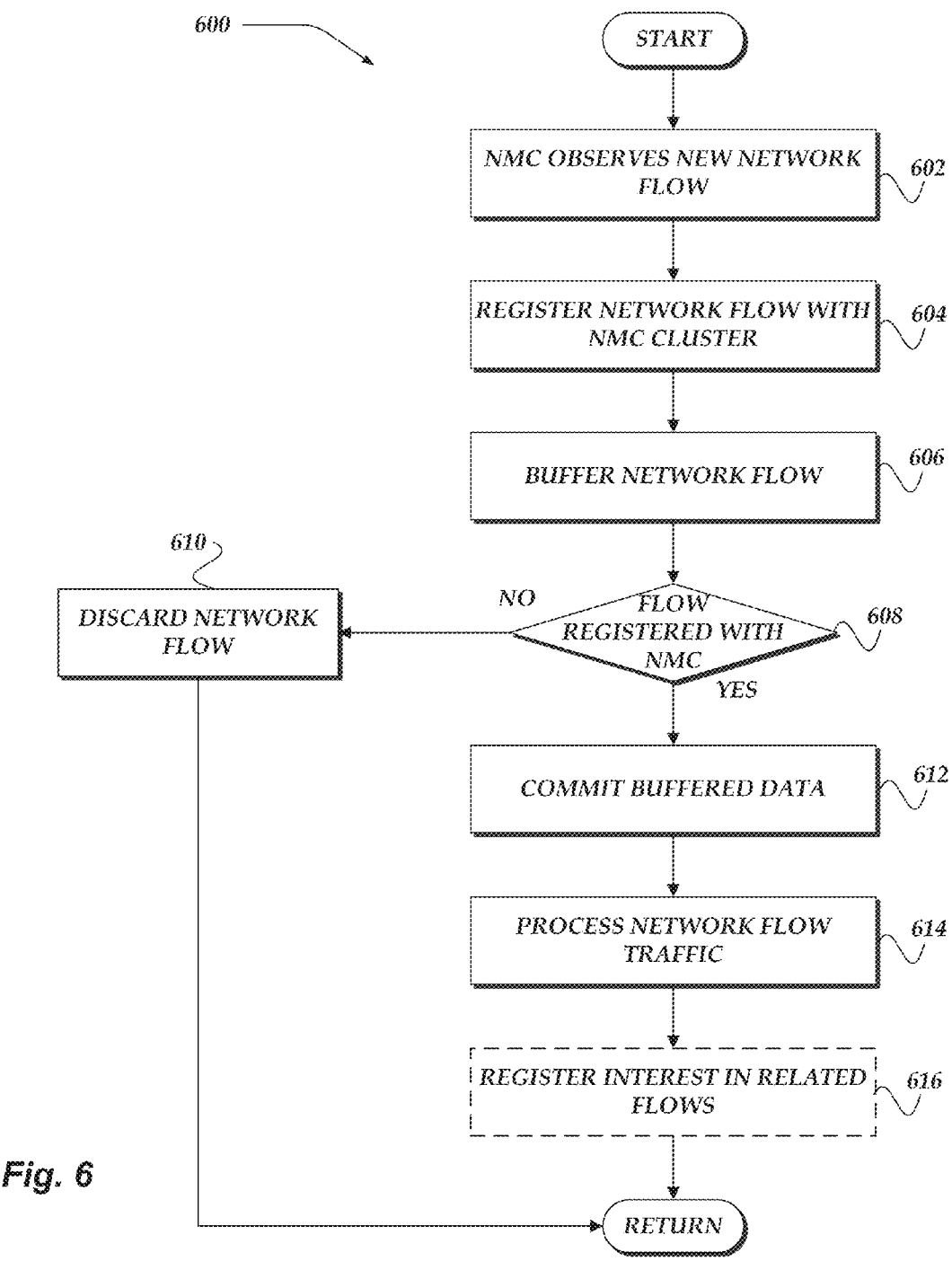
FIG. 6 illustrates an overview flowchart of a process for flow deduplication across a cluster of network monitoring devices in accordance with at least one of the various embodiments.
Figure 7:
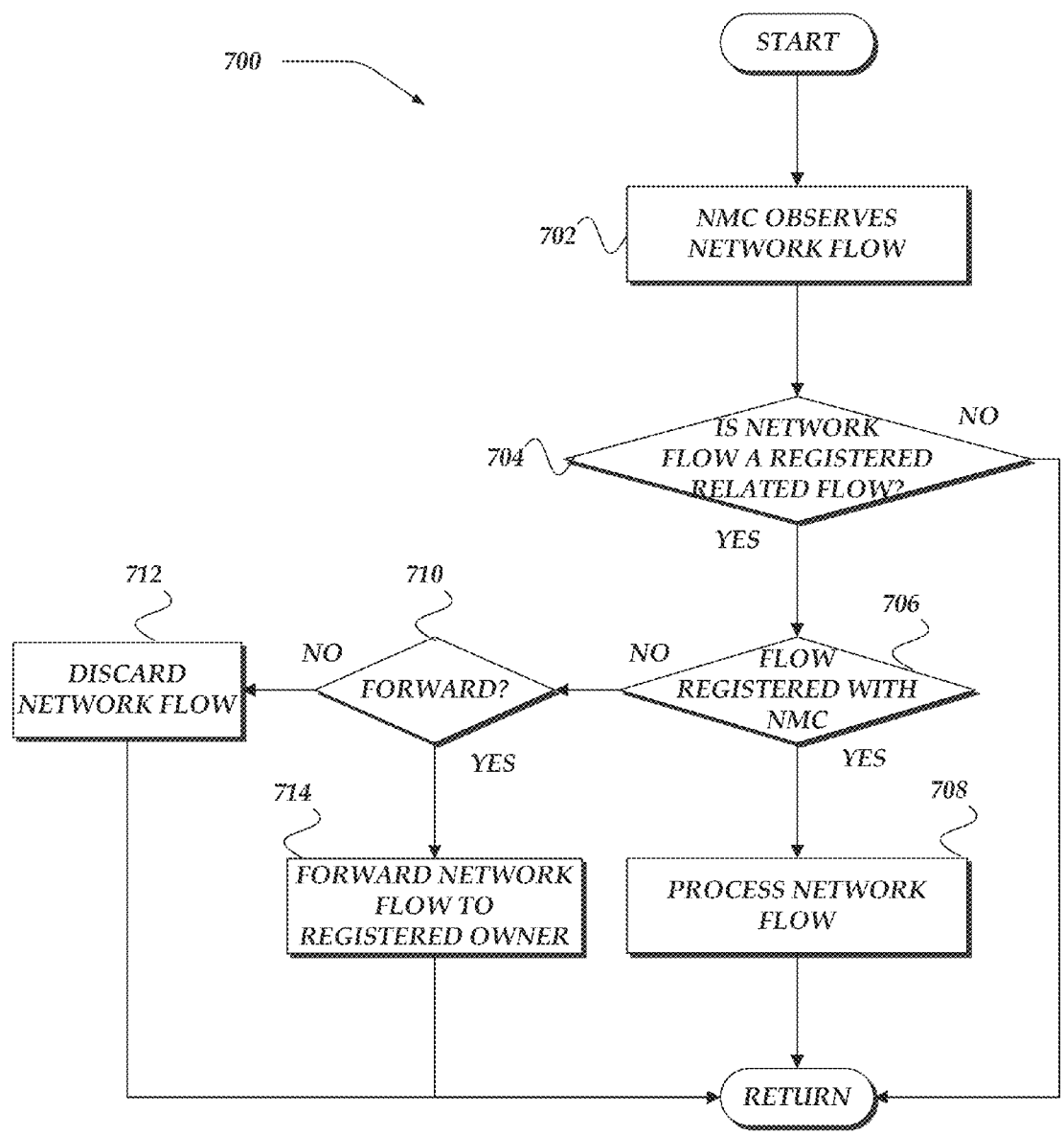
FIG. 7 illustrates an overview flowchart of a process for processing related network flows in accordance with at least one of the various embodiments.

FIGS. 5-7 represent the generalized operation for flow deduplication across a cluster of network monitoring devices in accordance with at least one of the various embodiments. In at least one of the various embodiments, processes 500, 600, and 700 described in conjunction with FIGS. 5-7 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 5-7 may be used for flow deduplication across a cluster of network monitoring devices in accordance with at least one of the various embodiments and/or architectures such as those described in conjunction with FIG. 4. Further, in at least one of the various embodiments, some or all of the actions performed by processes 500, 600, and 700 may be executed in part by network monitoring application 322 running on one or more processors of one or more network computers.

FIG. 5 illustrates an overview flowchart of process 500 for flow deduplication across a cluster of network monitoring devices in accordance with at least one of the various embodiments. After a start block, at block 502, in at least one of the various embodiments, a network monitoring computer (NMC) that is part of a cluster of NMCs may observe a network flow. In at least one of the various embodiments, the NMC may capture one or more network packets that may be determined to be associated with a network flow. In some embodiments, the NMC may employ tuple information that may be included in the network packets to identify a network flow to associate with the captured network packets.

At decision block 504, in at least one of the various embodiments, if the network flow is a new flow, control may flow to block 506, otherwise, control may flow to decision block 508. As mentioned above, in at least one of the various embodiments, a NMC may be arranged to store a network flow table in its memory. The network flow may maintain a list of network flows that have been observed by the NMC over a given time period. In some embodiments, meta-data, such as, but not limited to, timestamp information may be used to track the time of the latest activity of the network flow. For example, each time a network packet that is associated with a network flow is observed, its activity timestamp may be updated. Accordingly, in some embodiments, network flows may be removed (or over written) from the network flow table if the duration since last activity exceeds a defined threshold.

At block 506, in at least one of the various embodiments, the NMC may be arranged to attempt to register the network flow with its owner NMC. In at least one of the various embodiments, an owner NMC may be the NMC in a cluster that is responsible for processing a particular network flow. In at least one of the various embodiments, the NMC may be arranged to employ one or more methods or mechanisms to identify the NMC that may be responsible for the network flow.

In at least one of the various embodiments, the NMC may apply one or more policy rules to determine the NMC that may be responsible for the network flow. In some embodiments, the policy rules may statically define responsible NMCs based on the contents of the network flow. In at least one of the various embodiments, static rules that may be useful for processing known/anticipated network flows may be allocated based on, network/sub-network, endpoints, applications, or the like, or combination thereof.

In at least one of the various embodiments, if an NMC identifies the network application that is associated with the network flow, it may be arranged to select a particular NMC in the cluster to assign as the responsible NMC for the network flow. For example: an NMC policy rule may be arranged to assign one or more particular NMCs to be responsible for processing database application traffic; likewise, for example, an NMC policy rule may be arranged to assign other particular NMCs to process web server network flows; or the like.

In at least one of the various embodiments, the NMC may communicate with a leader NMC in the cluster that may be responsible for assigning network flows to NMCs in its cluster. Accordingly, in at least one of the various embodiments, the leader NMC may be arranged to employ one or more policies to select the NMC that may be responsible for the network flow.

In at least one of the various embodiments, the NMC may compute an index value based on the contents of network packets of the network flow to determine a responsible NMC within the cluster. In at least one of the various embodiments, a distributive hashing function may be applied to portions of the network packets to produce an index value that may be used as an identifier or to lookup an identifier to determine the responsible NMC.

In some embodiments, the index value associated with the NMC in the cluster may be cooperatively determined by the NMCs in the cluster. In some embodiments, a leader NMC elected by the cluster members may assign index values to cluster member NMCs. In at least one of the various embodiments, configuration information obtained from files, databases, or user input may associate index values with the NMCs in a cluster.

In at least one of the various embodiments, the tuple information of the network packets in a network flow may be provided to a distributed hash function to generate an index value. In some embodiment, other or additional information (e.g., fields) in the network packets may be used as part of computing the index value. In at least one of the various embodiments, the information for generating the index value may be selected such that the hashing function generates the same index value for each network packet that is associated with the same network flow.

In at least one of the various embodiments, hashing functions, such as, consistent hashing, rendezvous hashing, or the like, may be employed. In some embodiments, such functions may mitigate the failure of an NMC in a cluster or its removal from the cluster by avoiding reassigning network flows that are assigned to NMCs that remain (e.g., survivors) in the cluster.

In at least one of the various embodiments, hash values produced from hashing functions may be mapped to index values that refer to one or more NMCs in the cluster of NMCs. In at least one of the various embodiments, the hashing function may be arranged to directly produce an index value or in some embodiments, the value provided by a hash function may be masked or otherwise associated with bins or ranges of values that map to index values.

In at least one of the various embodiments, the index value or NMC identifier may reference two or more NMCs arranged into their own cluster. This may be considered a sub-cluster. Accordingly, in at least one of the various embodiments, sub-clusters may be arranged to perform distribution/assignment processes similar to as described for regular NMC clusters. For example, the configuration rules used to assign network flows to NMCs may be defined to assign all database-related traffic to an index value that references a sub-cluster of NMCs. At decision block 508, in at least one of the various embodiments, if the NMC that observed the network flow owns the network flow, control may proceed to block 512; otherwise, control may proceed to block 510.

At block 510, in at least one of the various embodiments, since the NMC is not responsible for processing the network flow, the network traffic associated with the network flow may be forwarded to a responsible NMC or it may be discarded. In at least one of the various embodiments, the network flow table of the NMC may include information that indicates whether the network flow should be discarded or whether the network flow should be forwarded to another NMC in the cluster. For example, a network flow table may include a column that includes an identifier for the NMC that is responsible for a given network flow. Accordingly, in this example, the absence of such an identifier may be interpreted as indicating the network traffic associated with the network flow should be discarded.

In at least one of the various embodiments, the registration process of block 506 may result in that there is no responsible for NMC for a network flow. Accordingly, in at least one of the various embodiments, an entry in the network flow table may be recorded for the network flow, but it may indicate that the network flow should be discarded.

In at least one of the various embodiments, the responsible NMC identifier that may be associated with a network flow may include a network address. Or, in at least one of the various embodiments, the NMC identifier may be another index value or identifier that may be mapped to a network address for the responsible NMC.

In at least one of the various embodiments, the NMCs in the cluster may be arranged to use another or separate network for communicating with cluster members. In some embodiments, this other network may be separate from the network(s) that carry the network traffic for the network flows.

In at least one of the various embodiments, forwarding may be adaptive. In some embodiments, an NMC may be arranged to forward network packets associated with one side of a communication session (e.g., unidirectional half-flows) to another NMC that was previously assigned a half-flow for the other side of the communication session. Subsequently, the NMC that is responsible for the other side of the half-flow may begin directly observing the complete flow. Accordingly, at that point it may be unnecessary for the NMC to forward the half-flow that it observers. In at least one of the various embodiments, the other NMC that is responsible for both half-flows may signal the forwarding NMCs to cancel the forwarding operations and to begin discarding the associated network packets. In some embodiments, the central leader NMC or other computer may signal the NMC to cancel forwarding network packets associated with a network flow.

At block 512, in at least one of the various embodiments, since the NMC that observed the network flow (block 502) is responsible for the network flow, it may apply one or more policy rules to determine how the network traffic that is associated with the network flow may be processed. For example, the NMC may be arranged to collect one or more performance metrics associated with the network flow. Next, control may be returned to a calling process.

FIG. 6 illustrates an overview flowchart of process 600 for flow deduplication across a cluster of network monitoring devices in accordance with at least one of the various embodiments. After a start block, at block 602, in at least one of the various embodiments, an NMC in a cluster of NMCs may observe or be provided network traffic that may be associated with a new network flow. In some embodiments, a new network flow may be a network flow that does not have a corresponding entry in the NMC's network flow table. In some cases, the network flow may be new to the network, in the sense, that a new endpoint (e.g., client computer) has joined the network and is putting traffic on the network. In other cases, the network flow may be new just to the NMC. In some cases, the network flow may have been removed from the NMC flow table because of inactivity. Likewise, in at least one of the various embodiments, the NMC may be new to the cluster, or it may have been rebooted or otherwise emptied/cleared its network flow table.

At block 604, in at least one of the various embodiments, the NMC may register the network flow with the NMC cluster. In at least one of the various embodiments, the NMC may be arranged to communicate some or all of the captured/observed network traffic to another NMC that may be the leader of the NMC cluster. Alternatively, in at least one of the various embodiments, the NMC may be arranged to communicate some or all of the captured/observed network traffic to a defined network computer (e.g., NMC, server computer, cloud instance, or the like) that may be arranged to perform one or more actions to register the network flow.

In at least one of the various embodiments, as described above, NMCs may be arranged to generate an identifier, such as, an index value from information included in the network traffic that is associated with the network flow. For example, tuple information included in network packets may be provided to a selection engine that may be executed to compute an index value that corresponds to a particular NMC in the cluster.

In at least one of the various embodiments, the NMC may maintain a list or table in memory that maps index values to network addresses of NMCs in the cluster. In at least one of the various embodiments, NMCs in a cluster may employ various methods to provide each other the information for mapping index values to their network addresses. For example, in some embodiments, NMCs may be arranged to announce themselves by broadcasting a handshaking/announcement message if they join a cluster network. Further, in at least one of the various embodiments, a designated NMC (e.g., a leader NMC) in the cluster may be elected to observe NMC announce messages and an assign index value that corresponds to the announcing NMC. Accordingly, the index value assignment may be disseminated to other NMCs in the cluster.

In at least one of the various embodiments, the NMC may simply employ a selection engine to generate an identifier, such as an index value, and then associate the identifier (and its corresponding NMC) with the observed network flow. In at least one of the various embodiments, the NMC may be arranged to send updates to one or more NMCs in the cluster regarding the registration status of the network flow.

At block 606, in at least one of the various embodiments, the NMC may begin buffering some or all of the network traffic that may be associated with the new network flow. In some embodiments, the registration process may take more or less time depending on various factors, such as, the particular registration process, network traffic load, status of the cluster (e.g., is the cluster busy performing administrative functions such as electing a leader NMC), or the like, or combination thereof. Accordingly, while the registration process may be streamlined and/or otherwise optimized for a particular application environment, it may still take time for it to complete.

In at least one of the various embodiments, the NMC may be arranged to store some or all of the network traffic for the network flow in a local memory buffer. In other embodiments, the NMC may be arranged to apply one or more rule-based policies that determine the type of summary information that may be buffered and/or one or more metrics that may be recorded.

At decision block 608, in at least one of the various embodiments, if the network flow is registered with the NMC that observed the new network flow, control may proceed to block 612; otherwise control may proceed to block 610. In at least one of the various embodiments, in some cases, the NMC that is working with the new network flow may be determined by the selection engine to be the NMC in the cluster that is responsible for processing the network flow.

At block 610, in at least one of the various embodiments, since the NMC that observed the network flow in block 602 is not responsible for processing the network flow, the network traffic associated with the network flow may be discarded. Likewise, in some embodiments, buffered network traffic and/or metrics that may be associated with the network flow may be discarded.

At block 612, in at least one of the various embodiments, the NMC may perform actions to commit the buffered network traffic and/or metrics collected during the registration process. In at least one of the various embodiments, the NMC may be arranged to include non-volatile memory that may be used to store the buffered information.

At block 614, in at least one of the various embodiments, since the NMC is responsible for the network flow it may begin processing the network traffic that may be associated with the network flow. In at least one of the various embodiments, since just one NMC in the cluster is responsible for a particular network flow, the processing will not be inadvertently duplicated by other NMCs in the cluster. In at least one of the various embodiments, the particular processing may be determined by the configuration of the NMC and/or one or more rule based policies that may be employed.

At block 616, in at least one of the various embodiments, optionally, the NMC may register its interest in network flows that may be related to the newly register network flow. In at least one of the various embodiments, an NMC may be arranged to look for particular network flows that may be related to one or more of the network flows currently registered. In at least one of the various embodiments, related network flows may be associated with particular network applications and/or operations that produce more than one network flow. For example, if a network application uses one network flow for incoming communication and another network flow for outgoing communication, an NMC may be configured to announce to the cluster of NMC that it should be responsible for both network flows.

Accordingly, in at least one of the various embodiments, if an NMC becomes responsible for one network flow that may be potentially associated with other related network flows, the NMC may communicate this to the other NMCs in the cluster. In some embodiments, the NMC may communicate its interest in related flows to a leader NMC or other computer that may be leading or coordinating operations for the NMC cluster.

In at least one of the various embodiments, an NMC may be configured with policy rules that define to classify whether network flows may be considered related. In some embodiments, network flows may be considered related based on their payload content as well as portions of their tuple information. For example, in some embodiments, NMCs in the cluster may be configured such that one NMC will be responsible for monitoring all network traffic that is directed to a particular network address or range of network addresses. Likewise, for example, a NMC cluster may be configured such that all network traffic directed to a set of TCP ports may be monitored by the same NMC. Further, for example, the NMC cluster may be configured such that all network flows that exhibit a defined behavior may be monitored by the same NMC.

Accordingly, in at least one of the various embodiments, other NMCs in the cluster, or a central coordination NMC/computer may record that a particular NMC is pre-registering to be responsible for certain classes/types of flows. Next, control may be returned to a calling process.

FIG. 7 illustrates an overview flowchart of process 700 for processing related network flows in accordance with at least one of the various embodiments. After a start block, at block 702, in at least one of the various embodiments, an NMC observes a network flow. In at least one of the various embodiments, an NMC may be arranged to observe network traffic that may be associated with a network flow as described above.

At decision block 704, in at least one of the various embodiments, if the network flow is a determined to be a registered related flow, control may flow to decision block 706; otherwise, control may be returned to a calling process. In at least one of the various embodiments, as described above, NMCs in a cluster may be configured to recognize related network flows. One or more policy configurations may include instructions and/or definitions for identifying sets of related network flows. Accordingly, if the NMC identifies a network flow that may be part of a related flows group or set it may perform actions to determine which NMC if any should be responsible for monitoring the related network flows.

In at least one of the various embodiments, the NMC may be arranged to begin buffering some or all of the network traffic associated with the network flow. As described above, the NMC may be arranged to apply one or more rule-based policies to determine buffering policies and/or if performance metrics should be accumulated for the network flow. In at least one of the various embodiments, the buffering may prevent the loss of data that may be received while the NMC is determining which NMC in the cluster may be responsible for the network flow (if any).

Also, in at least one of the various embodiments, instead of buffering the network traffic, the NMC may be arranged to process the network flow without committing the results of the processing. Accordingly, in some embodiments, the NMC may accumulate values for one or more metrics associated with the network flow but refrain from committing such metrics until the NMC responsible for the network flow may be determined. At decision block 706, in at least one of the various embodiments, if the NMC is determined to be responsible for the related network flow, control may flow to block 708; otherwise, control may flow to decision block 710. In at least one of the various embodiments, in this case, the NMC that receives the network traffic for the related network flow is the same NMC that may be responsible for monitoring the related network flow. For example, if a new network flow is assigned to the NMC and later the NMC observes network traffic from a network flow that is related to the newly assigned network flow, that NMC may be responsible for the related network flow. Likewise, if another NMC has registered its interest in the network flow, other actions may be taken.

At block 708, in at least one of the various embodiments, since the NMC is determined to be responsible for the network flows it may begin processing it as per its configuration and/or rule-based policies. Next, control may be returned to a calling process.

At decision 710, in at least one of the various embodiments, since the network flow is a related network flow and the NMC is not responsible for monitoring the network flow, it may be arranged to forward the network traffic for the network flow to another NMC in the cluster. In at least one of the various embodiments, if the network traffic for the network flow should be forwarded to another NMC in the cluster, control may proceed to block 714; otherwise, control may proceed to block 712 where the flow traffic may be discarded. In at least one of the various embodiments, NMCs may be configured to forward network traffic for certain network flows and not forward traffic for other network flows.

At block 714, in at least one of the various embodiments, the network traffic associated with the network flow may be forwarded to the registered NMC that is responsible for monitoring the network flow. In some embodiments, the NMC may be arranged to forward one or more metric values and/or summary information rather than forwarding the actual network traffic. Further, in some embodiments, the NMC may be configured to forward some types of network traffic (e.g., traffic for particular applications) while it may be configured to forward metric values and/or summary information for other types of network traffic.

In at least one of the various embodiments, the network traffic for the network flow may not be directly accessible (e.g., visible) to the responsible NMC. Accordingly, the NMC may be arranged to forward the network traffic of the related network flow to another NMC. For example, in some embodiments, NMC A may be responsible for network flow F1 and has registered its interest in monitoring traffic from related flows as well. NMC B may be in the same NMC cluster as NMC A, but it may be enabled to observe networks that are not observable by NMC A. For example, this may be because an intervening router configuration is blocking NMC A from seeing the same networks and network traffic as NMC B. Accordingly, NMC B may observe network traffic from network flow F2 that NMC A is unable to observe or access. If, for this example, network flow F2 is related to network flow F1, NMC A will be unable to access the network traffic associated with network flow F2. However, in this example, since NMC A and NMC B are in the same NMC cluster, NMC B may be arranged to forward the network traffic of network flow F2 to NMC A via the cluster network. In at least one of the various embodiments, in this scenario, the observing NMC may continuously forward network traffic of the related network flow to the responsible NMC. Alternatively, in some embodiments, instead of forwarding network traffic directly, the observing NMC may be configured to forward metric values and/or summary information that was the result of processing the flow.

In at least one of the various embodiments, the observing NMC may be arranged to register as the responsible NMC for the related network flow. Accordingly, other NMCs in cluster that observe network traffic associated with the related network flow may discard the related network flow traffic rather than forwarding it to the NMC that has registered its interest in the related flows. In at least one of the various embodiments, this may be advantageous if the related network flows are on networks that the NMC that registered its interest in the related flows cannot access or observe.

In at least one of the various embodiments, the observing NMC and the responsible NMC may both have access to the network traffic of the related network flows. Accordingly, the observing NMC may be arranged to forward data it has buffered to the responsible NMC. In at least one of the various embodiments, the network flow tables of the NMC in the cluster may be updated to reflect that the related network flow is owned by the responsible NMC. Accordingly, subsequent network traffic for the network flow may be discarded. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In at least one embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for monitoring flows of packets over a network, wherein one or more processors in a network computer execute instructions to perform actions, comprising:
employing a network monitoring computer (NMC) in a plurality of NMCs, that is provided a new network flow, to perform further actions, including:
buffering network traffic information associated with the new network flow in a non-transitory processor readable media;
registering the new network flow with the plurality of NMCs, wherein registration provides an identifier that corresponds to one or more of the plurality of NMCs and provides an indication that the one or more NMCs that correspond to the identifier have registered an interest in one or more network flows that are related to the new network flow;
forwarding network traffic information that is associated with the one or more related network flows to the one or more NMCs that correspond to the identifier;
employing the identifier, which corresponds to the NMC that was provided the new network flow, to process network traffic associated with the new network flow using the NMC that was provided the new network flow; and
employing the identifier, which corresponds to another NMC, to forward the buffered network traffic information to the other NMC.

2. The method of claim 1, wherein registering the new network flow with the plurality of NMCs, further comprises, assigning the one or more NMCs to monitor the new network flow, wherein the one or more NMCs correspond to the identifier.

3. The method of claim 1, further comprising, when a provided network flow is absent from a network flow table of the NMC, classifying the provided network flow is the new network flow.

4. The method of claim 1, wherein registering the new network flow with the plurality of NMCs, further comprises providing the identifier based on a hashing of some or all of the tuple information that is associated with the new network flow.

5. The method of claim 1, further comprising, storing information associated with the new network flow in a network flow table, wherein the information includes, one or more of tuple information, the identifier, or a timeout value.

6. The method of claim 1, wherein registering the new network flow with the plurality of NMCs, further comprises, providing the identifier based on an execution of one or more defined static policies.

7. A system for monitoring flows of packets over a network comprising:
a network computer, comprising:
a transceiver that communicates over the network;
a memory that stores at least instructions; and
one or more processors that execute instructions that perform actions, including:
employing a network monitoring computer (NMC) in a plurality of NMCs, that is provided a new network flow, to perform further actions, including:
buffering network traffic information associated with the new network flow in a non-transitory processor readable media;
registering the new network flow with the plurality of NMCs, wherein registration provides an identifier that corresponds to one or more of the plurality of NMCs and provides an indication that the one or more NMCs that correspond to the identifier have registered an interest in one or more network flows that are related to the new network flow;
forwarding network traffic information that is associated with the one or more related network flows to the one or more NMCs that correspond to the identifier;
employing the identifier, which corresponds to the NMC that was provided the new network flow, to process network traffic associated with the new network flow using the NMC that was provided the new network flow; and
employing the identifier, which corresponds to another NMC, to forward the buffered network traffic information to the other NMC; and
a client computer, comprising:
a transceiver that communicates over the network;
a memory that stores at least instructions; and
one or more processors that execute instructions that perform actions, including:

providing the new network flow to the NMC in the plurality of NMCs.

8. The system of claim 7, wherein registering the new network flow with the plurality of NMCs, further comprises, assigning the one or more NMCs to monitor the new network flow, wherein the one or more NMCs correspond to the identifier.

9. The system of claim 7, further comprising, when a provided network flow is absent from a network flow table of the NMC, classifying the provided network flow is the new network flow.

10. The system of claim 7, wherein registering the new network flow with the plurality of NMCs, further comprises, providing the identifier based on a hashing of some or all of the tuple information that is associated with the new network flow.

11. The system of claim 7, further comprising, storing information associated with the new network flow in a network flow table, wherein the information includes, one or more of tuple information, the identifier, or a timeout value.

12. The system of claim 7, wherein registering the new network flow with the plurality of NMCs, further comprises, providing the identifier based on an execution of one or more defined static policies.

13. A processor readable non-transitory storage media that includes instructions for monitoring flows of packets over a network, wherein execution of the instructions by one or more processors performs actions, comprising:
employing a network monitoring computer (NMC) in a plurality of NMCs, that is provided a new network flow, to perform further actions, including:
buffering network traffic information associated with the new network flow in a non-transitory processor readable media;
registering the new network flow with the plurality of NMCs, wherein registration provides an identifier that corresponds to one or more of the plurality of NMCs and provides an indication that the one or more NMCs that correspond to the identifier have registered an interest in one or more network flows that are related to the new network flow;
forwarding network traffic information that is associated with the one or more related network flows to the one or more NMCs that correspond to the identifier;
employing the identifier, which corresponds to the NMC that was provided the new network flow, to process network traffic associated with the new network flow using the NMC that was provided the new network flow; and
employing the identifier, which corresponds to another NMC, to forward the buffered network traffic information to the other NMC.

14. The media of claim 13, wherein registering the new network flow with the plurality of NMCs, further comprises, assigning the one or more NMCs to monitor the new network flow, wherein the one or more NMCs correspond to the identifier.

15. The media of claim 13, further comprising, when a provided network flow is absent from a network flow table of the NMC, classifying the provided network flow is the new network flow.

16. The media of claim 13, wherein registering the new network flow with the plurality of NMCs, further comprises, providing the identifier based on a hashing of some or all of the tuple information that is associated with the new network flow.

17. The media of claim 13, further comprising, storing information associated with the new network flow in a network flow table, wherein the information includes, one or more of tuple information, the identifier, or a timeout value.

18. The media of claim 13, wherein registering the new network flow with the plurality of NMCs, further comprises, providing the identifier based on an execution of one or more defined static policies.

19. A network computer for monitoring flows of packets over a network, comprising:
a transceiver that communicates over the network;
a memory that stores at least instructions; and
one or more processors that execute instructions that perform actions, including:
employing a network monitoring computer (NMC) in a plurality of NMCs, that is provided a new network flow, to perform further actions, including:
buffering network traffic information associated with the new network flow in a non-transitory processor readable media;
registering the new network flow with the plurality of NMCs, wherein registration provides an identifier that corresponds to one or more of the plurality of NMCs and provides an indication that the one or more NMCs that correspond to the identifier have registered an interest in one or more network flows that are related to the new network flow;
forwarding network traffic information that is associated with the one or more related network flows to the one or more NMCs that correspond to the identifier;
employing the identifier, which corresponds to the NMC that was provided the new network flow, to process network traffic associated with the new network flow using the NMC that was provided the new network flow; and
employing the identifier, which corresponds to another NMC, to forward the buffered network traffic information to the other NMC.

20. The network computer of claim 19, wherein registering the new network flow with the plurality of NMCs, further comprises, assigning the one or more NMCs to monitor the new network flow, wherein the one or more NMCs correspond to the identifier.

21. The network computer of claim 19, further comprising, when a provided network flow is absent from a network flow table of the NMC, classifying the provided network flow is the new network flow.

22. The network computer of claim 19, wherein registering the new network flow with the plurality of NMCs, further comprises, providing the identifier based on a hashing of some or all of the tuple information that is associated with the new network flow.

23. The network computer of claim 19, further comprising, storing information associated with the new network flow in a network flow table, wherein the information includes, one or more of tuple information, the identifier, or a timeout value.

24. The network computer of claim 19, wherein registering the new network flow with the plurality of NMCs, further comprises, providing the identifier based on an execution of one or more defined static policies.

* * * * *

UNITED STATES PATENT AND TRADEMARK OFFICE
CERTIFICATE OF CORRECTION

PATENT NO. : 9,660,879 B1
APPLICATION NO. : 15/219016
DATED : May 23, 2017
INVENTOR(S) : Rothstein et al.

Page 1 of 1

It is certified that error appears in the above-identified patent and that said Letters Patent is hereby corrected as shown below:

In the Specification

In Column 23, Line 14, delete "embodiment," and insert -- embodiments, --, therefor.

In Column 26, Lines 59-60, delete "NMC/computer" and insert -- NMC --, therefor.

In the Claims

In Column 30, Line 30, in Claim 7, delete "network comprising:" and insert -- network, comprising: --, therefor.

Signed and Sealed this
Twenty-second Day of May, 2018

Andrei Iancu
*Director of the United States Patent and Trademark Office*